United States Patent
Thorn et al.

(10) Patent No.: US 7,694,538 B2
(45) Date of Patent: Apr. 13, 2010

(54) DEVICE AND METHOD FOR SENSING TEMPERATURE OF A ROTATING ELECTROMAGNETIC MACHINE

(75) Inventors: J Stephen Thorn, Florissant, MO (US); Bret S Clark, St. Louis, MO (US); Joseph G Marcinkiewicz, St. Charles, MO (US); Vinod Sadasivam, St. Louis, MO (US); Darko Marcetic, St. Louis, MO (US); Gregory M Levine, St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 932 days.

(21) Appl. No.: 10/906,305

(22) Filed: Feb. 14, 2005

(65) Prior Publication Data

US 2006/0179895 A1    Aug. 17, 2006

(51) Int. Cl.
*B08B 3/12*    (2006.01)

(52) U.S. Cl. .................. 68/12.16; 68/3 R; 318/701; 318/727; 324/441; 361/25

(58) Field of Classification Search .................. None
See application file for complete search history.

(56) References Cited

U.S. PATENT DOCUMENTS

| | | | |
|---|---|---|---|
| 4,413,325 A | | 11/1983 | Elfner et al. |
| 4,914,386 A | * | 4/1990 | Zocholl ................ 324/772 |
| 6,085,588 A | * | 7/2000 | Khadkikar et al. ...... 73/204.27 |
| 6,339,307 B1 | | 1/2002 | Andersson et al. |
| 6,366,865 B1 | | 4/2002 | Chalupa et al. |
| 6,504,358 B1 | | 1/2003 | Maier et al. |
| 2003/0052627 A1 | * | 3/2003 | Raimondi ................ 318/107 |
| 2006/0087277 A1 | * | 4/2006 | Norell et al. ............. 318/701 |

FOREIGN PATENT DOCUMENTS

| | | | |
|---|---|---|---|
| EP | 0 478 807 A | | 4/1992 |
| KR | 2003033688 A | * | 5/2003 |
| WO | WO 02087050 A1 | * | 10/2002 |

OTHER PUBLICATIONS

Derwent KR 2003033688 A (to Koo) English abstract.*
International Search Report for Corresponding International Patent Application No. PCT/US2006/005140.
Written Opinion of the International Searching Authority for Corresponding International Patent Application No. PCT/US2006/005140.

* cited by examiner

*Primary Examiner*—Michael Kornakov
*Assistant Examiner*—Eric Golightly
(74) *Attorney, Agent, or Firm*—Locke Lord Bissell & Liddell LLP

(57) ABSTRACT

A system and method of determining the temperature of a rotating electromagnetic machine, such as an electric motor or generator. A temperature calibration parameter is calculated based on the temperature of an object situated close to the motor, such as a motor drive connected to the motor, and a first resistance value of the winding. In exemplary embodiments, the motor drive and first resistance value are determined only after the motor has been idle for some predetermined time period. Once the calibration parameter is calculated, the processor uses it along with subsequent resistance measurements to calculate the temperature of the motor.

12 Claims, 2 Drawing Sheets

DEVICE AND METHOD FOR SENSING TEMPERATURE OF A ROTATING ELECTROMAGNETIC MACHINE

BACKGROUND

The present invention relates generally to sensing the temperature of a rotating electromagnetic machine such as an electric motor or generator.

In many applications for rotating electromagnetic machines, the temperature of the machine must be monitored and managed. For instance, clothes washing machines are typically powered by an electric motor. Residential and commercial clothes washing machines are well known. A generally cylindrical drum or basket for holding the clothing and other articles to be washed is mounted within a cabinet and rotated by the electric motor. During a wash cycle, water and detergent or soap are forced through the clothes to wash them. The detergent is rinsed from the clothes, then during one or more spin cycles the water is extracted from the clothes by spinning the drum.

Vertical-axis washing machines have the drum situated to spin about a vertical axis. Articles to be washed are loaded into the drum through a door, which is usually situated on the top of the washing machine. A vertical-axis washing machine drum includes an agitator situated therein, which cleans clothes by pushing and pulling them down into the water. Horizontal-axis washing machines have the drum oriented to spin about an essentially horizontal axis. During wash cycles, the drum of the horizontal-axis washing machines rotates at a relatively low speed. The rotation speed of the drum is such that clothes are lifted up out of the water, using baffles distributed about the drum, then dropped back into the water as the drum revolves. In some washing machines, the rotation direction is periodically reversed to get the desired washing action.

Both vertical and horizontal-axis washing machines extract water from clothes by spinning the drum, such that centrifugal force extracts water from the clothes. It is desirable to spin the drum at a high speed and extract the maximum amount of water from the clothes in the shortest possible time. Spin time is reduced, but more power is required to spin at a higher speed.

When the washing machine drum contains a large load, the motor works harder to rotate the drum. Economically sized motors can get too hot if run continuously at high power, as may occur with a large load. Power use can be modulated to control temperature, if the temperature is known. Unfortunately, adding hardware for sensing the motor temperature adds cost and complexity to the system. A sensorless means for determining motor temperature is therefore desirable.

The present application addresses shortcomings associated with the prior art.

SUMMARY

In accordance with certain teachings of the present disclosure, a system and method of determining the temperature of a rotating electromagnetic machine such as an electric motor or generator is provided. The machine (hereinafter referred to simply as "the motor") includes an energizable winding connected to receive power from a power source. A temperature calibration parameter is calculated based on the temperature of an object situated close to the motor, such as a motor drive connected to the motor, and a first resistance value of the winding. For example, a typical motor drive includes a heatsink with a temperature measurement device is connected thereto. This can be used to measure the temperature of the motor drive.

In exemplary embodiments, the motor drive and first resistance value are determined only after the motor has been idle for some predetermined time period. A processor, which may be a component of the motor drive, is programmed to determine the resistance value and to calculate the calibration parameter based on the resistance value and a measured temperature of the motor drive. Once the calibration parameter is calculated, the processor uses it along with subsequent resistance measurements to calculate the temperature of the motor. In applications where the processor does not receive continuous power and thus cannot monitor the idle time, an external component, such as a machine controller, determines whether the predetermined time period has elapsed. The winding resistance can be determined by applying current to the winding and determining a voltage level required to maintain the current at a desired level.

A suitable application for the temperature sensing method and system is in a clothes washing machine system that includes a cabinet with a drum situated to rotate inside the cabinet. The motor is operably connected to the drum to rotate the drum. Based on the temperature determinations, operation of the motor can be varied to avoid over heating.

BRIEF DESCRIPTION OF THE DRAWINGS

Other objects and advantages of the invention will become apparent upon reading the following detailed description and upon reference to the drawings in which.

Figure 1:
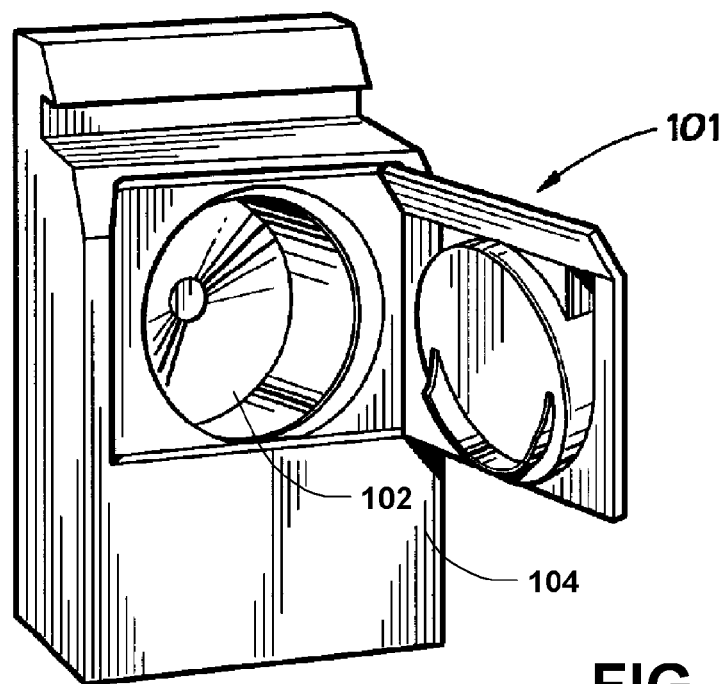
FIG. 1 is a perspective view of an exemplary washing machine system embodying certain aspects of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As noted above, temperature must be monitored and managed in many applications using rotating electromagnetic machines, such as electric motors and generators. For sake of simplicity, the term "motor" refers to rotating electromagnet machines. An example of such an application is a clothes washing machine powered by an electric motor. FIG. 1 illustrates an exemplary washing machine 101 embodying various teachings of the present disclosure. The washing machine 101 shown in FIG. 1 is a horizontal-axis machine, having a drum 102 situated in a cabinet 104.

Figure 2:
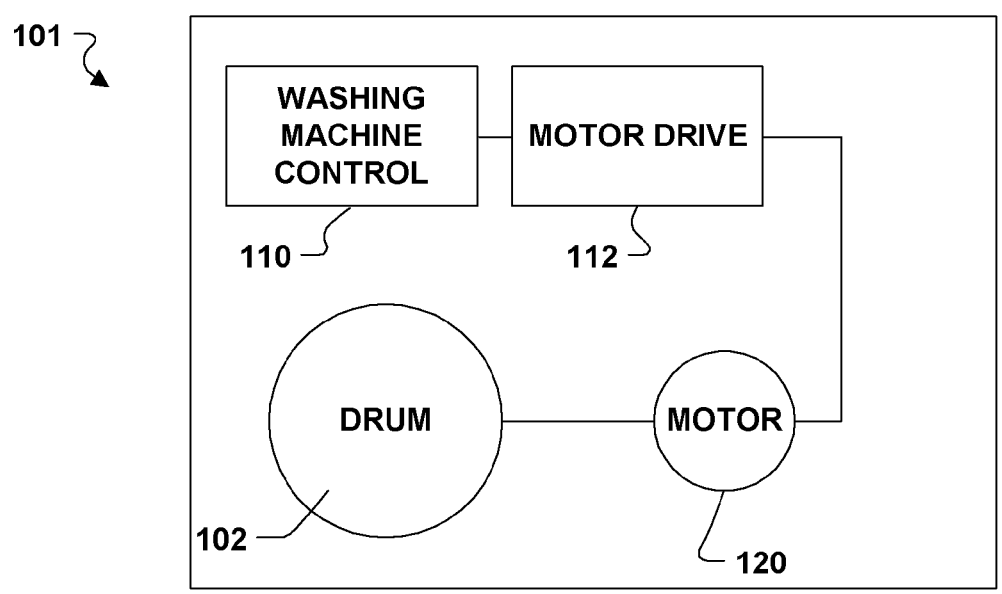
FIG. 2 is a block diagram schematically illustrating components of the system shown in FIG. 1.

FIG. 2 is a simple block diagram illustrating certain of the components of the washing machine 101. A washing machine controller 110 receives and provides inputs and outputs to control the various operations of the washing machine. It is connected to a motor drive 112 that controls operation of an electric motor 120, which drives the drum 102.

Figure 3:
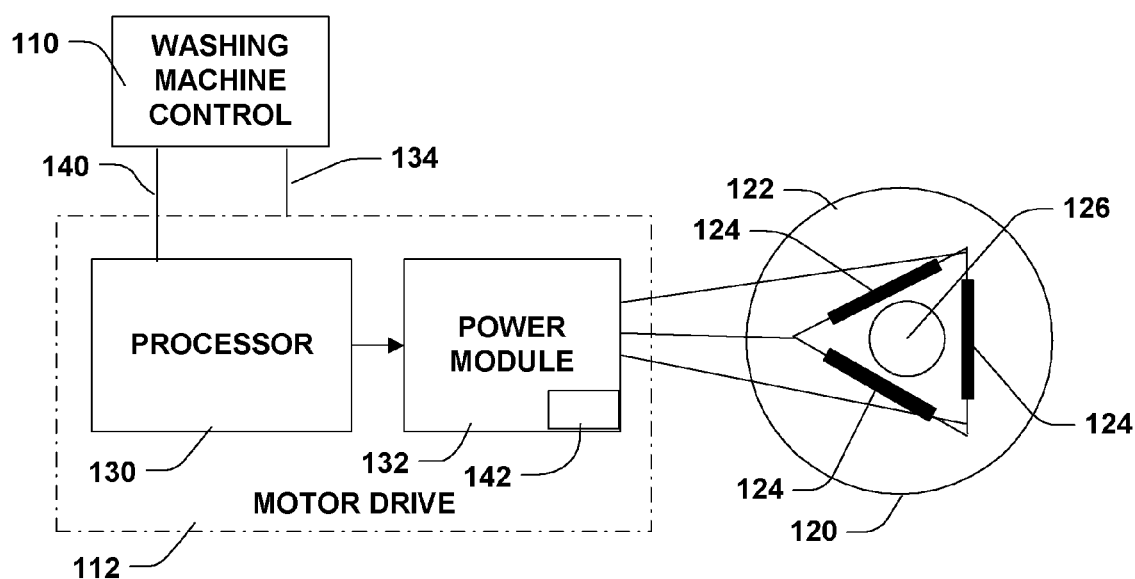
FIG. 3 is a block diagram further illustrating portions of the system shown in FIGS. 1 and 2.

FIG. 3 illustrates additional aspects of the motor drive 112 and motor 120. In exemplary embodiments, a three-phase induction motor is employed. The motor 120 includes a stationary member, or stator 122, that has a plurality of windings 124 disposed therein. In the disclosed embodiment, the windings 124 comprise copper wire. A rotating member, or rotor 126, is situated within the stator 122 to rotate relative thereto. In a three-phase induction motor, a rotating magnetic field is established by applying three-phase sinusoidal alternating voltages to the stator windings 124 to effect rotation of the rotor 126.

The motor drive 112 includes a processor 130 and a power module 132, and it receives power from the washing machine control 110 via a main power line 134. The power module is connected to the motor 120 to energize the windings 124 to operate the motor. A communications line 140 is connected between the washing machine controller 110 and the motor drive's processor 130.

When the washing machine drum 102 contains a large load, the temperature of the motor 120 increases as it works to rotate the drum 102. As noted above, it is thus desirable to monitor the temperature of the motor 120. It is well known that resistance in a wire, such as the motor windings 124, is dependent on temperature. The definition of temperature coefficient, $\alpha=(R-R0)/R0*(T-T0)$, where R and R0 are resistances and T and T0 are temperatures, leads to the model $$T=kR+T1$$

which can be rewritten as $$k=(T-T1)/R \quad \text{(Equation 1)}$$

where k is a calibration parameter, T is the temperature of the motor 120, R is the resistance of the windings 124 and T1 is a temperature constant.

The resistance R of the winding 124 can be measured by putting a constant current through the winding 124 and measuring the voltage required to maintain the desired current. In the exemplary embodiments, the terminal voltage is measured and compensated for other components included in the power module 132 as necessary. The voltage is supplied to the motor 120 by a pulse-width modulated (PWM) inverter bridge included in the power module 132. The PWM voltage required to maintain the constant current is averaged over some predetermined number of samples (4,800 samples at 16 kHz in one implementation).

The temperature T1 in the model is a constant and is a characteristic of copper. Data from the CRC Handbook of Chemistry and Physics, 49th Edition, for resistance of copper wires at temperatures from 0 to 75° C. was fit to equation 1 by linear regression to obtain T1=−233.9° C.

In the population of motors used in a particular washing machine application, the winding resistance at room temperature varies so much that it would correspond to a temperature variation of about 70° C. as determined by a resistance measurement. That variation is too large to be acceptable, so the calibration constant k must be adjusted for each motor. In the washing machine manufacturing process, or in washing machine service repairs, it is costly and unreliable to make a manual adjustment of k, therefore, an automatic means of calibrating the temperature measurement is desirable.

Once the motor has been idle for some period, it can be assumed that the motor has cooled to ambient temperature. Once the motor temperature reaches ambient, it can be assumed that the temperature of the motor is the same or nearly the same as another object in close proximity to the motor. Thus, if the temperature of the object in close proximity to the motor can be determined, this temperature can be used for the temperature calibration.

In many motor applications, such as the washing machine application described herein, the motor drive 112 is situated close to the motor. The motor drive's power module 132 includes a heatsink temperature sensor 142 to monitor the temperature of the power module 132 and prevent damage to its electronic components due to overheating. In accordance with teachings of the present disclosure, the power module heatsink temperature sensor 142 is used to establish that the motor 120 is at a particular temperature since the motor 120 and the motor drive 112 are physically located close to each other in the washing machine 101.

The heatsink in the motor drive 112 and the motor 120 likely have different thermal time constants and heating rates—it cannot be assumed that the heatsink located in the motor drive 112 and the motor would always be the same temperature. To be sure that the motor is at the same temperature as the drive, some predetermined time period must elapse since the motor was powered before the calibration process is executed. In one implementation, the time period is two hours.

In a washing machine application, the motor drive 112 isn't continuously powered so it cannot keep track of the idle time for a long period. However, the washing machine controller 110 is typically continuously powered (the washing machine itself is typically continuously connected to mains power). So the machine control 110 can determine whether the required time period has elapsed since the motor 120 was last powered. When the washing machine controller 110 powers up the motor drive 112, it sends a message meaning "OK to calibrate" to the drive if the predetermined time period has elapsed. The motor drive 112 then calculates a value for the calibration parameter k using the heatsink temperature value $T_{heatsink}$ for the motor temperature and the corresponding winding resistance value R as follows:

$$k=(T{heatsink}+234)/R$$

As described above, R can be measured by putting a current pulse through the winding 124 and measuring the voltage required to maintain the desired current. This new value for k is stored in the motor drive non-volatile memory, and used for further motor temperature calculations based on subsequent winding resistance measurements.

Accordingly, if the calculated temperature exceeds some predetermined value, corrective action can be taken. For example, in one exemplary system, the drum rotation direction is periodically reversed. If the temperature exceeds a first temperature limit, a waiting period is added or increased before changing the rotation direction to allow the motor to cool. If the temperature exceeds a second limit, the motor is shut down and an alarm is activated.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A motor system, comprising:
   a motor having an energizable winding;
   a motor drive connected to the winding;
   a temperature measurement device connected to the motor drive and configured to measure the temperature of the motor drive rather than the temperature of the motor winding;
   a processor programmed to determine a temperature calibration parameter based on the temperature of the motor drive and a first resistance value of the winding; and
   wherein the processor is further programmed to determine a temperature value of the motor based on the calibration parameter and a second resistance value of the winding.

2. The motor system of claim 1, wherein the processor is further programmed to determine the temperature calibration parameter after a predetermined time period has elapsed during which the motor has been idle.

3. The motor system of claim 2, further comprising a controller connected to the motor drive, wherein the controller determines whether the predetermined time period has elapsed.

4. The motor system of claim 1, wherein the motor drive includes a heatsink, and wherein the temperature measurement device is connected to the heatsink to determine the temperature of the heatsink.

5. The motor system of claim 1, wherein the motor is an induction motor.

6. A clothes washing machine system, comprising
   a cabinet;
   a drum situated to rotate inside the cabinet;
   a motor operably connected to the drum to rotate the drum, the motor including an energizable winding;
   a motor drive connected to the winding;
   a temperature measurement device connected to the motor drive and configured to measure the temperature of the motor drive directly rather than the temperature of the motor winding;
   a processor programmed to determine a temperature calibration parameter based on the temperature of the motor drive and a first resistance value of the winding and which is also programmed to determine the first and second resistance values by applying current to the winding and determining a voltage level required in order to maintain the current at a desired level; and
   wherein the processor is further programmed to determine a temperature value of the motor based on the calibration parameter and a second resistance value of the winding.

7. The clothes washing system of claim 6, wherein the motor is an induction motor.

8. The clothes washing system of claim 6, wherein the processor determines the temperature calibration parameter after a predetermined time period has elapsed during which the motor has been idle.

9. The clothes washing system of claim 6, further comprising a controller connected to the motor drive, wherein the controller determines whether the predetermined time period has elapsed.

10. The clothes washing system of claim 6, wherein the motor drive includes a heatsink, and wherein the temperature measurement device is connected to the heatsink to determine the temperature of the heatsink.

11. The motor system of claim 1, wherein the system does not include a temperature measurement device configured to measure the temperature of the motor winding directly, rather the temperature of the motor winding is assumed to be that of the motor drive when taking the first resistance value and is thereafter determined using the second resistance value of the winding and the calibration parameter.

12. A motor system, comprising:
    a machine;
    a motor within the machine and having an energizable winding;
    another object within the machine;
    a temperature measurement device configured to measure the temperature of the object;
    a processor programmed to determine a temperature calibration parameter based on the temperature of the object and a first resistance value of the winding; and
    wherein the processor is further programmed to determine a temperature value of the motor based on the calibration parameter and a second resistance value of the winding.

* * * * *